(12) United States Patent
Joh et al.

(10) Patent No.: US 8,615,228 B2
(45) Date of Patent: Dec. 24, 2013

(54) MOBILE TERMINAL AND CONTROLLING METHOD THEREOF

(75) Inventors: Jaemin Joh, Anyang-si (KR); Injik Lee, Seoul (KR); Sunhwa Cha, Seoul (KR); Daesung Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 267 days.

(21) Appl. No.: 13/099,775

(22) Filed: May 3, 2011

(65) Prior Publication Data

US 2012/0052909 A1    Mar. 1, 2012

(30) Foreign Application Priority Data

Aug. 31, 2010 (KR) .......................... 10-2010-0084745

(51) Int. Cl.
*H04M 3/00* (2006.01)

(52) U.S. Cl.
USPC .......................................... 455/420; 455/418

(58) Field of Classification Search
USPC ................................................ 455/418–420
See application file for complete search history.

(56) References Cited

U.S. PATENT DOCUMENTS

| 8,032,383 B1* | 10/2011 | Bhardwaj et al. | 704/275 |
| 2003/0167171 A1* | 9/2003 | Calderone et al. | 704/270 |
| 2009/0268754 A1* | 10/2009 | Palm et al. | 370/466 |
| 2011/0145581 A1* | 6/2011 | Malhotra et al. | 713/171 |

FOREIGN PATENT DOCUMENTS

EP    1 079 371 A1    2/2001

* cited by examiner

*Primary Examiner* — Steven Lim
(74) *Attorney, Agent, or Firm* — Birch, Stewart, Kolasch & Birch, LLP

(57) ABSTRACT

A mobile terminal and controlling method thereof are disclosed, by which a user can control a mobile terminal and each device connected to the mobile terminal using a speech via the mobile terminal while the mobile terminal and external digital devices are connected together via a prescribed interface. The present invention includes a display unit, a user input unit, a microphone, a communication module and a controller, when connected to at least one external device via the communication module, if a electric signal corresponding to a user's speech command is inputted via the microphone in a speech recognition mode, recognizing the speech command by analyzing the electric signal, the controller controlling the recognized speech command to be displayed as a prescribed graphic user interface (GUI) on the display unit.

17 Claims, 15 Drawing Sheets

FIG. 13
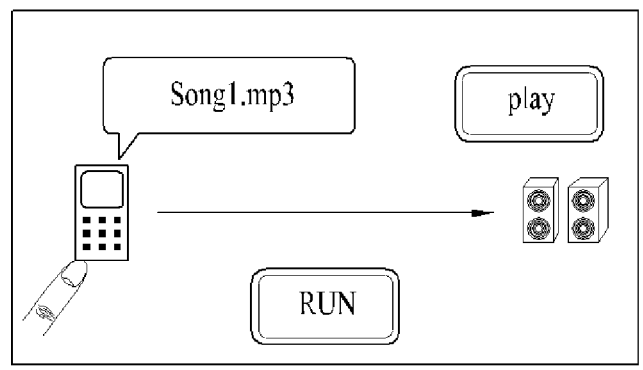
(a)
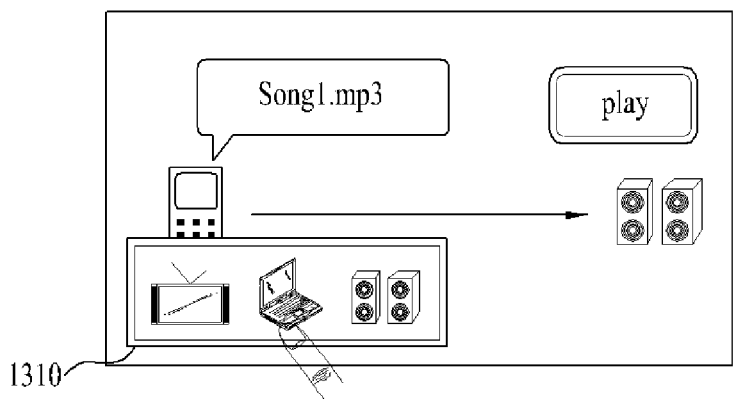
(b)
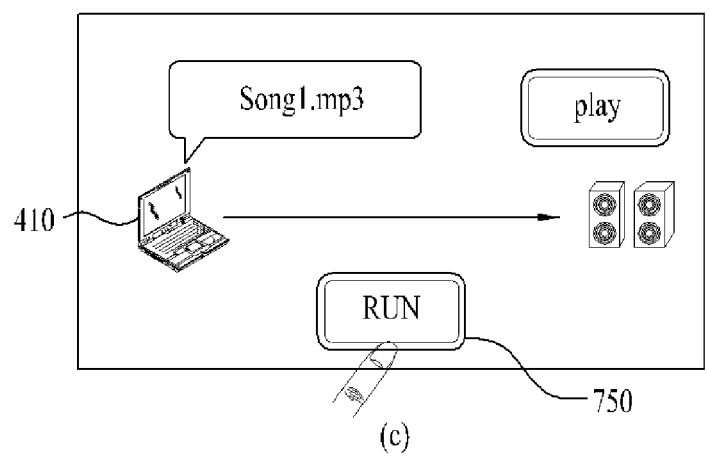
(c)

FIG. 14
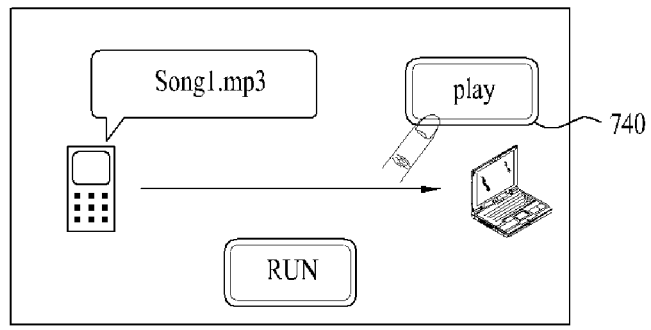
(a)
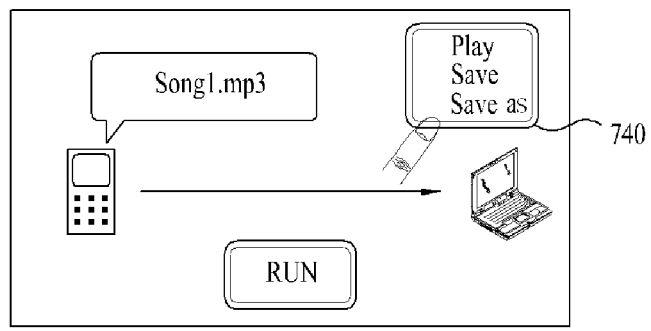
(b)
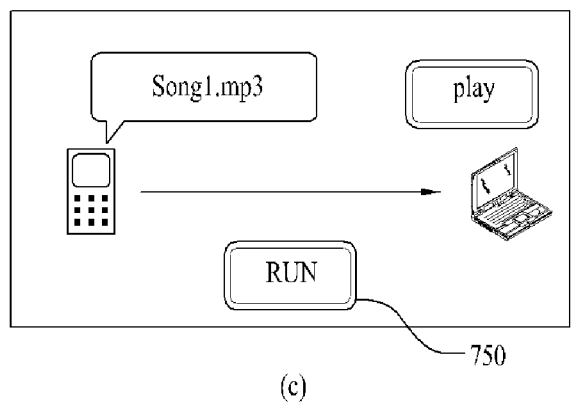
(c)

FIG. 15
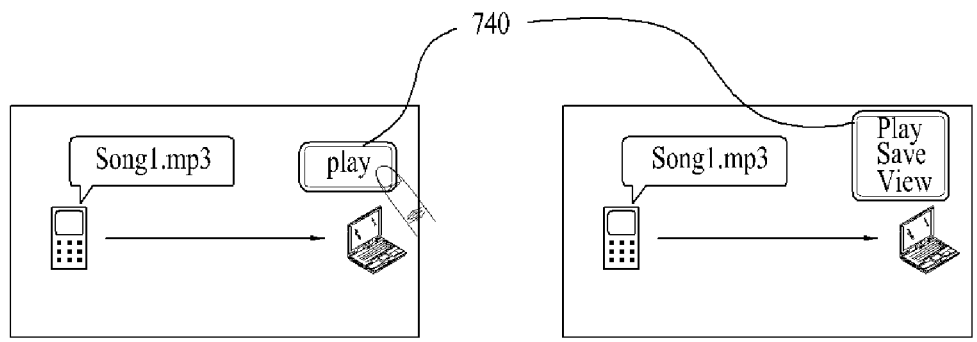
(a) (b)
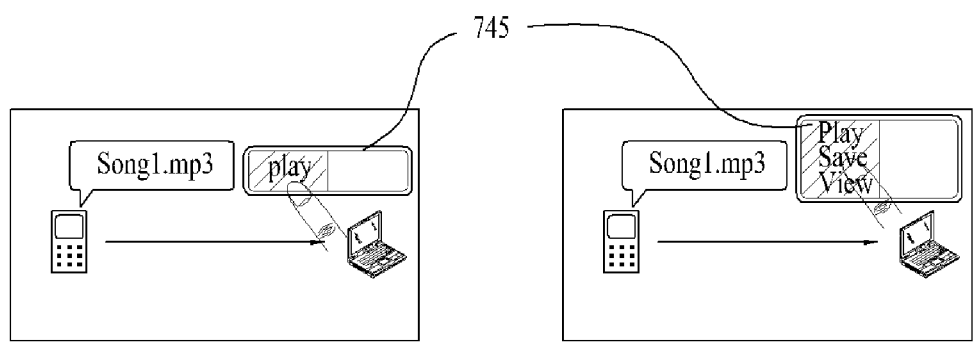
(c) (d)
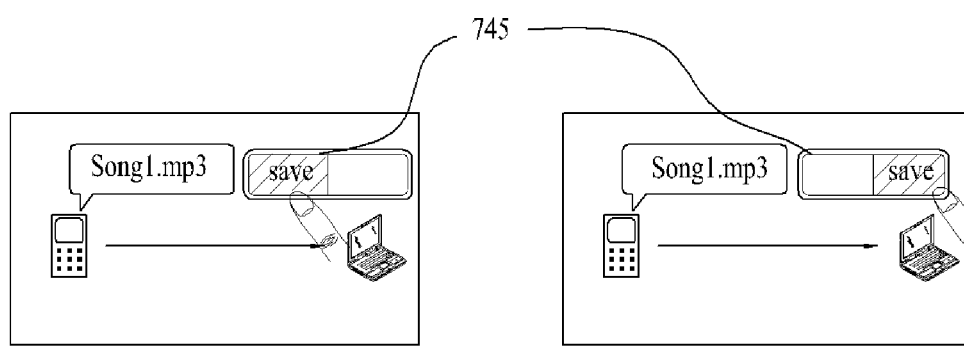
(e) (f)

MOBILE TERMINAL AND CONTROLLING METHOD THEREOF

Pursuant to 35 U.S.C. §119(a), this application claims the benefit of earlier filing date and right of priority to Korean Patent Application No. 10-2010-0084745, filed on Aug. 31, 2010, the contents of which are hereby incorporated by reference herein in their entirety.

BACKGROUND OF THE INVENTION

1. Field of the Invention

The present invention relates to a mobile terminal, and more particularly, to a mobile terminal and controlling method thereof. Although the present invention is suitable for a wide scope of applications, it is particularly suitable for a user to control a mobile terminal and each device connected to the mobile terminal using a speech via the mobile terminal while the mobile terminal and external digital devices are connected together via a prescribed interface.

2. Discussion of the Related Art

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or moving picture files, game play, broadcast reception and the like for example.

To support and increase of the terminal functions, it may be able to consider the improvement of structural parts and/or software parts of the terminal.

However, in using a plurality of digital devices including a mobile terminal, it is inconvenient to control each of the devices individually. Recently, there are ongoing developments of digital devices capable of exchanging information with each other by being connected to each other. And, corresponding standardization is in progress. Therefore, the demand for a method of controlling digital devices connected together via a mobile terminal more conveniently is rising.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and controlling method thereof, by which the mobile terminal and an external device connected thereto can be more conveniently controlled via a speech recognition command in at least one external device connected environment.

Another object of the present invention is to provide a mobile terminal and controlling method thereof, by which a speech command recognized in at least one external device connected environment can be modified and executed more conveniently.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a display unit, a user input unit configured to receive an input of a command from a user, a microphone converting a speech signal to an electric signal, a communication module configured to externally transceive a signal by wire/wireless, and a controller, when connected to at least one external device via the communication module, if the electric signal corresponding to a user's speech command is inputted via the microphone in a speech recognition mode, recognizing the speech command by analyzing the electric signal, the controller controlling the recognized speech command to be displayed as a prescribed graphic user interface (GUI) on the display unit.

In another aspect of the present invention, a method of controlling a mobile terminal includes the steps of performing a connection to at least one external device via a communication module configured to externally transceive a signal by wire/wireless, if an electric signal corresponding to a user's speech command is inputted via a microphone in a speech recognition mode, recognizing the speech command by analyzing the electric signal, and controlling the recognized speech command to be displayed as a prescribed graphic user interface (GUI) on a display unit.

Accordingly, the present invention provides the following effects and/or advantages.

First of all, a mobile terminal and an external device connected thereto can be more conveniently controlled via a speech recognition command in at least one external device connected environment.

Secondly, a speech command recognized can be modified and executed more conveniently by a simple manipulation via a mobile terminal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 13 is a diagram for one example of a source device switching method according to one embodiment of the present invention;

FIG. 14 is a diagram for one example of a method of changing an operation to execute in a speech command recognized by a mobile terminal according to one embodiment of the present invention; and FIG. 15 is a diagram for one example of a method of changing an operation to execute in a speech command recognized by a mobile terminal according to one embodiment of the present invention and then executing the changed operation.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile as well as stationary terminals, such as mobile phones, user equipment, smart phones, DTV, computers, digital broadcast terminals, personal digital assistants, portable multimedia players (PMP) and navigators.

However, by way of non-limiting example only, further description will be with regard to a mobile terminal 100, and it should be noted that such teachings may apply equally to other types of terminals.

Figure 1:
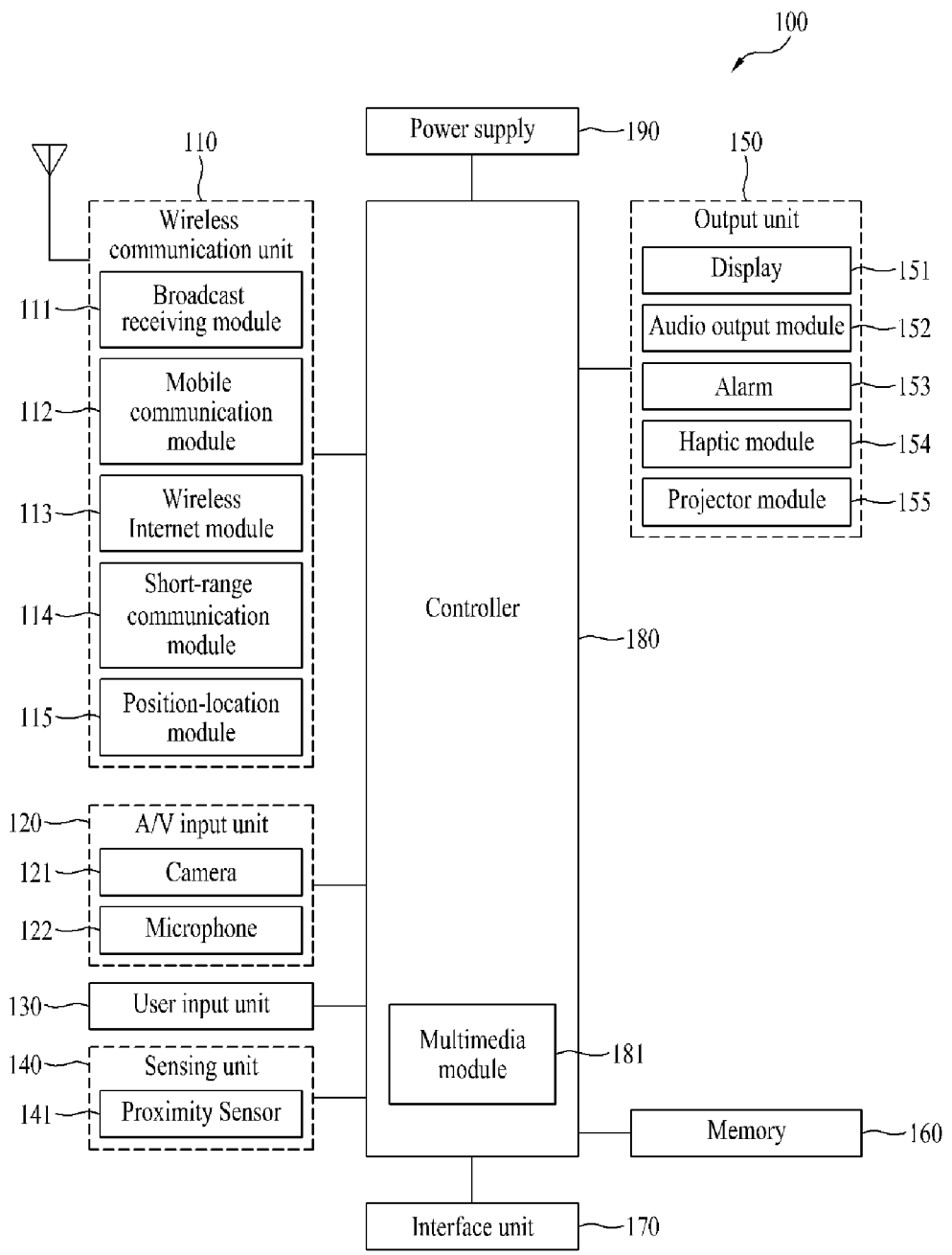
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmissive type, which can be named a transparent display. As a representative example for the transparent display, there is TOLED (transparent OLED) or the like. A rear configuration of the display 151 can be implemented in the optical transmissive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmissive photoelectric sensor, a direct reflective photoelectric sensor, mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
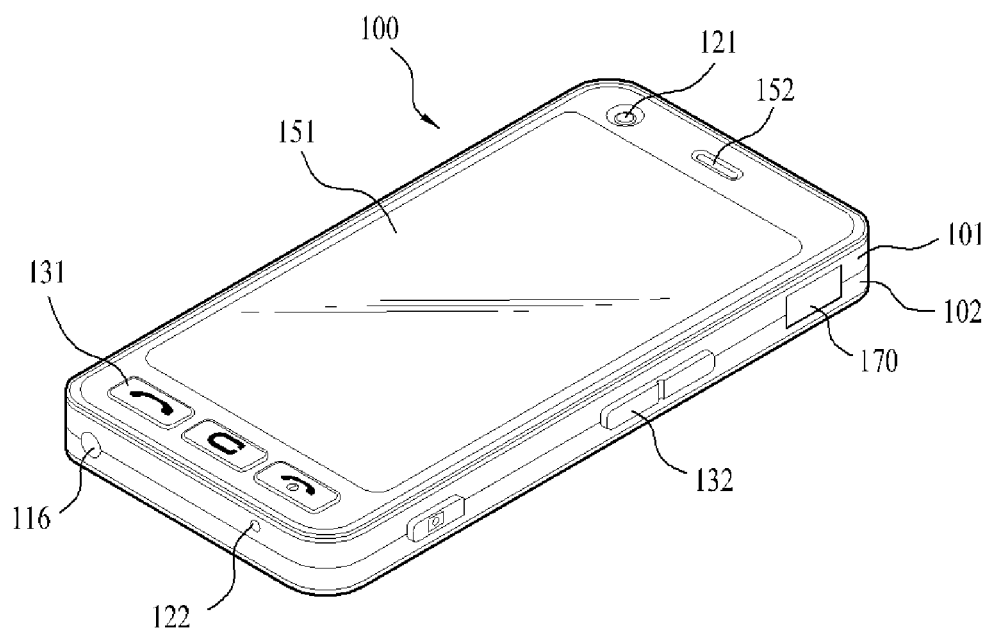
FIG. 2 is a front perspective diagram of a mobile terminal according to one embodiment of the present invention.

FIG. 2 is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

Interconnected operational mechanism between the display 151 and the touchpad 135 are explained with reference to FIG. 3 as follows.

Figure 3:
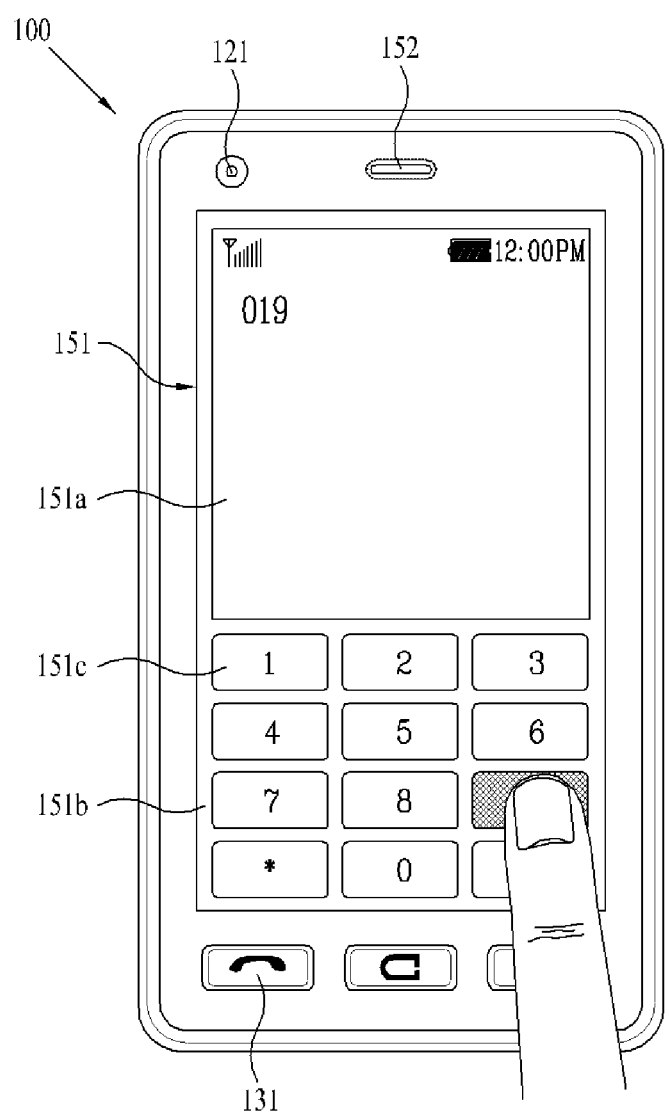
FIG. 3 is a front diagram of a mobile terminal according to one embodiment of the present invention to describe one operative status thereof.

FIG. 3 is a front-view diagram of a terminal according to one embodiment of the present invention for explaining an operational state thereof.

First of all, various kinds of visual information can be displayed on the display 151. And, theses information can be displayed in characters, numerals, symbols, graphics, icons and the like.

In order to input the information, at least one of the characters, numerals, symbols, graphics and icons are represented as a single predetermined array to be implemented in a keypad formation. And, this keypad formation can be so-called 'soft keys'.

FIG. 3 shows that a touch applied to a soft key is inputted through a front face of a terminal body.

The display 151 is operable through an entire area or by being divided into a plurality of regions. In the latter case, a plurality of the regions can be configured interoperable.

For instance, an output window 151a and an input window 151b are displayed on the display 151. A soft key 151c' representing a digit for inputting a phone number or the like is outputted to the input window 151b. If the soft key 151c' is touched, a digit corresponding to the touched soft key is outputted to the output window 151a. If the first manipulating unit 131 is manipulated, a call connection for the phone number displayed on the output window 151a is attempted.

Besides, the display 151 or the touchpad 135 can be configured to receive a touch input by scroll. A user scrolls the display 151 or the touchpad 135 to shift a cursor or pointer located at an entity (e.g., icon or the like) displayed on the display 151. Furthermore, in case that a finger is shifted on the display 151 or the touchpad 135, a path of the shifted finger can be visually displayed on the display 151. This may be useful in editing an image displayed on the display 151.

To cope with a case that both of the display (touch screen) 151 and the touchpad 135 are touched together within a predetermined time range, one function of the terminal can be executed. The above case of the simultaneous touch may correspond to a case that the terminal body is held by a user using a thumb and a first finger (clamping). The above function can include activation or deactivation for the display 151 or the touchpad 135.

For clarity and convenience of the following description, a mobile terminal mentioned in the following description is assumed as including at least one of the components shown in FIG. 1. Meanwhile, such a graphic for pointing at a specific object on a display unit or selecting a menu from the display unit as an arrow, a finger and the like is called a pointer or a cursor. Yet, the pointer is frequently used to mean a finger, a stylus pen or the like for a touch manipulation and the like. In order to clearly discriminate the pointer and the cursor from each other in this disclosure, a graphic displayed on a display unit is named a cursor and such a physical means for performing a touch, a proximity touch, a gesture and the like as a finger, a stylus pen and the like is named a pointer.

In general, an application is conceptionally used as software separately installed and/or executed. Yet, an application mentioned in the description of the present invention conceptionally indicates all targets that visually display information on a prescribed region when a specific function is executed. The controller 180 of the mobile terminal according to the present invention is able to control at least two applications simultaneously. In doing so, the executed applications are displayed on partitioned screens of the display unit 151, respectively. Alternatively, one of the executed applications is displayed on a whole screen of the display unit 151. Alternatively, one of the executed applications is displayed in a manner of blocking at least one portion of a region related to the other executed application. Moreover, assume that the controller 180 of the mobile terminal 100 according to the present invention is able to perform a multitasking function of executing and controlling the above-mentioned at least two applications simultaneously.

Control Via External Display Device Connection & Contents Play/Exchange

Recently, the rapidly developed performance of a processor (i.e., the controller 180) of a mobile terminal enables the advanced operations. Moreover, the performance enhancement of the wireless communication unit 110 enables highspeed data communications via various radio interfaces. Accordingly, data, and more particularly, displayed video/ contents can be shared between mobile terminals or digital appliances having different display devices. Of course, the data sharing between the appliances or devices can be performed by wire systems as well as wireless systems.

The compatible technologies for the contents exchange between digital devices are internationally ongoing to be standardized. For examples, DLNA (digital living network alliance) participates in the standardization. The DLNA standard proposes various conditions and methods for the mutual data exchanges among various kinds of digital devices. A connecting method, specifications and the like in the embodiments of the presence invention can be supplemented by the DLNA standard documents, by which the present invention is non-limited. Moreover, the present invention can be performed via various kinds of communication interfaces (e.g., Wi-Fi, Bluetooth, IEEE1394, USB, infrared communication, etc.). In order to deliver a content to a renderer from a server, a source of the content is intactly delivered and then reproduced, a screen shot of a still cut is transmitted by sampling a video of a displayed content by specific periodicity, or a real-time video streaming in a prescribed frame can be used. Besides, after a separate sharing application for contents sharing has been installed each of the server and the renderer, data exchange can be performed according to the type defined in the sharing application.

Figure 4:
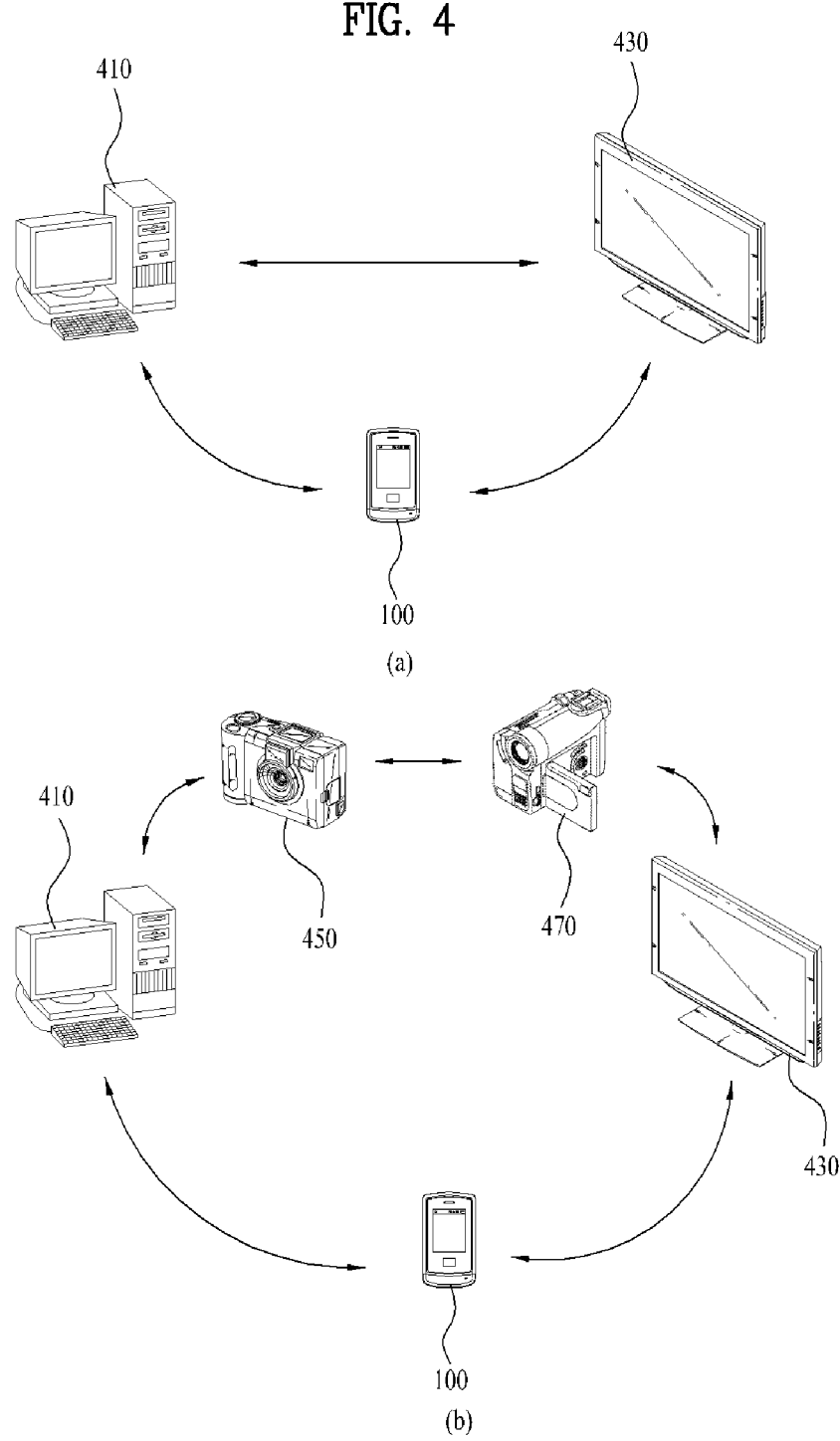
FIG. 4 is a diagram for one example of digital device connections applicable to embodiments of the present invention.

FIG. 4 is a diagram for example of connections among digital devices applicable to embodiments of the present invention.

Referring to FIG. 4 (a), a terminal 100 according to the present invention is connected to a computer 410 and a television 430 by wire/wireless to perform contents/data exchanges with the connected computer or television. In this case, contents sharing can be performed in a following manner. Firs of all, one device plays a role as a content server configured to supply a content to the other device and the other plays a role as a renderer configured to receive and display the corresponding content. Alternatively, one device plays a role as a controller configured to control a device playing a role as a content server and the other performs a content display function only. For instance, if the computer 410 becomes a content server, the mobile terminal 100 controls the computer 410 to enable a specific content in the computer 410 to be displayed on the television 430. In addition, the inter-device connection according to the present invention can be configured in a manner that a content server also performs a control function and that a renderer responsible for a display of content performs the control function together.

The above-described inter-device connection can be configured in a manner of further including a digital camera 450 and a digital camcorder 470 [FIG. 4 (b)].

Speech Command Input Via Speech Recognition

As mentioned in the foregoing description, while digital devices including a mobile terminal are connected to each other, a method of controlling the mobile terminal and devices connected to the mobile terminal via speech recognition according to the present invention is provided.

According to the present invention, assume that a user's speech is converted to an electric signal via the microphone 122 provided to the mobile terminal 100. Assume that the controller 180 interprets the electric signal as a command. And, assume that the mobile terminal is able to control the connected devices to perform the corresponding command by wire/wireless.

In the following description, a method of controlling a mobile terminal and devices connected to the mobile terminal via speech recognition according to one embodiment of the present invention is conceptionally explained.

Figure 5:
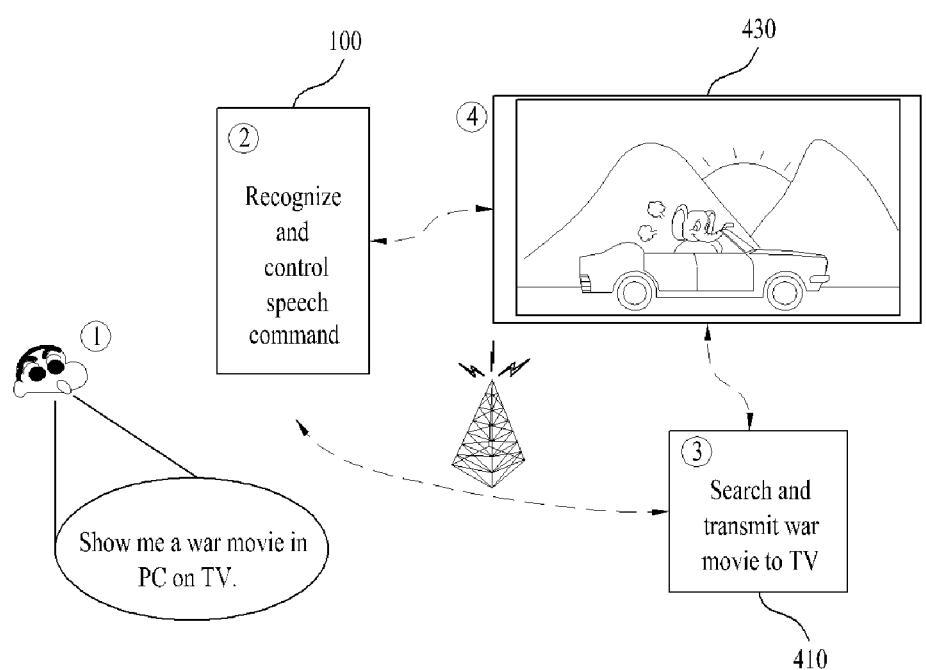
FIG. 5 is a conceptional diagram for one example of a controlling method via speech recognition according to one embodiment of the present invention.

FIG. 5 is a conceptional diagram for one example of a controlling method via speech recognition according to one embodiment of the present invention.

Referring to FIG. 5, a user is able to input a command using a speech. If the user's speech is inputted via the microphone 122 of the mobile terminal 100, the microphone 122 converts the user's speech to an electrical signal. The controller 180 interprets the electric signal and is then able to recognize a command corresponding to the interpreted electric signal. For instance, if the user says, 'Show me a war movie in a PC on TV.', the controller 180 recognizes that a source device providing a content is a PC 410, that a content of the command target is 'war movie', that a target device is a TV 430, and that an operation to perform on the content is 'show', i.e., 'play'.

Hence, the controller 180 of the mobile terminal 100 instructs the PC 410 to search for the war movie and transmit the found war movie to the TV by wire/wireless and is also able to instruct the TV 430 to play the corresponding war movie by wire/wireless.

Through the above-described speech command, the user is able to conveniently control the mobile terminal and the devices connected to the mobile terminal without a physical contact with the mobile terminal in a speech recognizable distance.

In the following description, a method of controlling a mobile terminal and devices connected to the mobile terminal via speech recognition according to one embodiment of the present invention is explained in detail with reference to FIG. 6.

Figure 6:
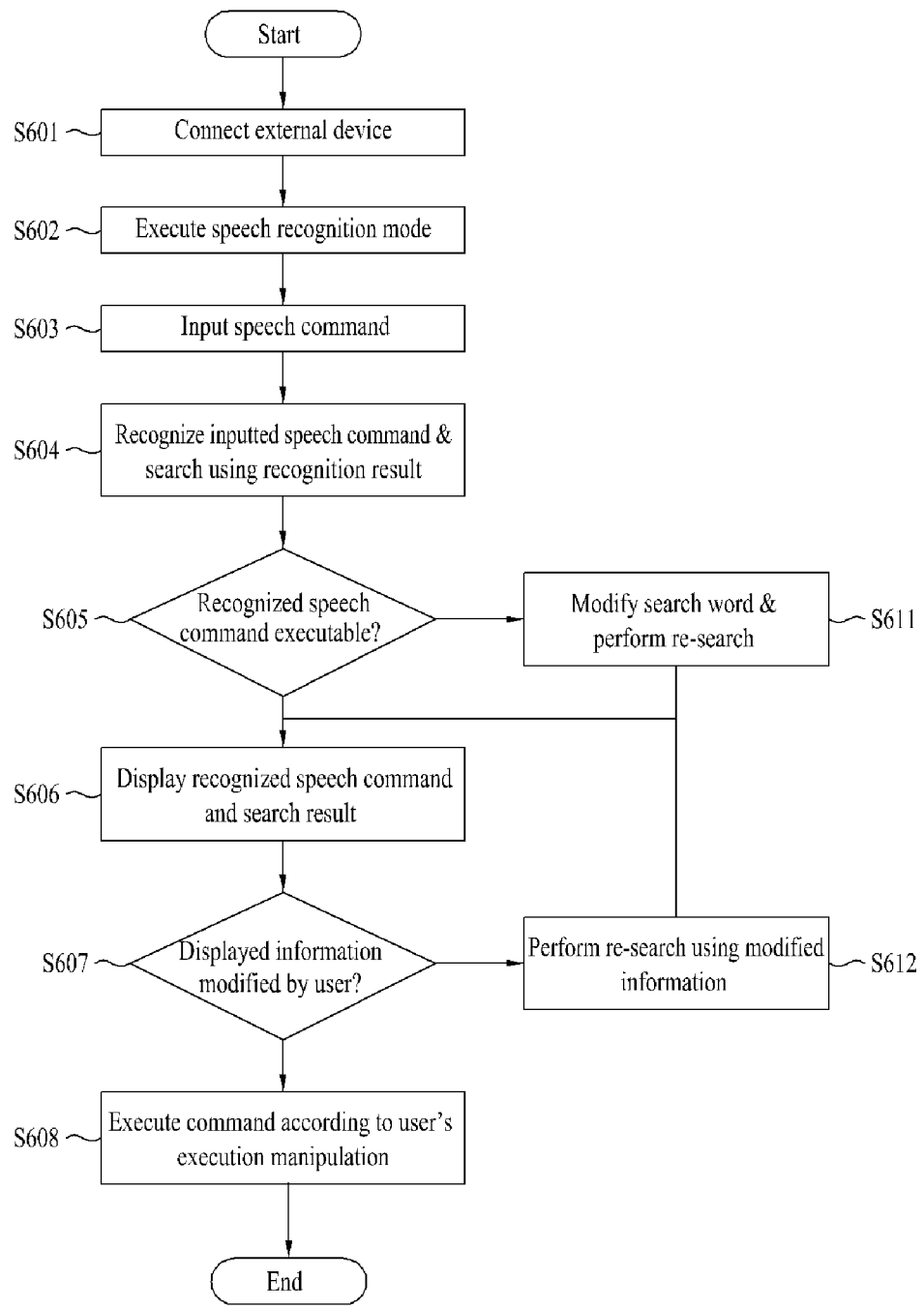
FIG. 6 is a flowchart of a process for recognizing a user's speech and performing a control corresponding to the user's speech in a mobile terminal according to one embodiment of the present invention.

FIG. 6 is a flowchart of a process for recognizing a user's speech and performing a control corresponding to the user's speech in a mobile terminal according to one embodiment of the present invention.

Referring to FIG. 6, a user enables the control unit 180 to perform a connection to at least one external device by such connection and DLNA by performing a prescribed menu manipulation on the user input unit 130 of the mobile terminal 100 [S601].

As the connection is performed, if a data path between the corresponding external device and the mobile terminal is established, the user is able to execute a speech recognition mode of the mobile terminal by performing a prescribed menu manipulation to recognize a user's speech as a control command [S602]. In doing so, for the speech recognition, the controller 180 is able to activate the microphone 122.

While the speech recognition mode is activated, if the user inputs a speech command via the microphone 122 [S603], the controller 180 interprets an electric signal delivered from the microphone 122 as a corresponding command and then performs a search according to the interpreted command [S604].

In doing so, when the controller 180 interprets the speech command, it is able to use STT (speech to text) scheme of converting a speech (converted to an electric signal) to a corresponding text or the like. Once the speech is converted to a text, the controller 180 determines what kind of role is performed in the command by each text. For instance, if a text 'computer' is included in the STT conversion result of the speech command inputted by the user, the controller needs to regard it as one a source device, a target device or a content name.

In this case [1)], a format of the speech command is determined in advance to enable a user to follow the corresponding sequence (e.g., source device → content → target device → operation to execute) and the controller 180 is then able to interpret the speech command in order of the STT converted text.

Alternatively [2)], it is able to set a preposition to be recognizable. For instance, if such a preposition as 'on', 'at' and the like is detected, it is able to set a word behind the corresponding preposition to be recognized as a target device. For another instance, if such a preposition as 'from', 'of', 'in' and the like is detected, it is able to set a word behind the corresponding preposition to be recognized as a source device.

Once the speech command is recognized by the aforesaid method, the controller 180 searches to determine whether the mobile terminal 100 or the device connected to the mobile terminal 100 is able to perform the corresponding command according to the recognized command. For instance, if the user commands for a target device to play a specific content of a source device, the controller 180 searches a connected device list for a source device and a target device included in the corresponding command and is then able to control the source device to be searched for the corresponding content [S604].

For this, the controller 180 requests a content list from each connected device in connecting the devices and is then able to directly search the connected device for contents. Alternatively, the controller 180 delivers a search word and a search command to the connected device to perform a corresponding search and is then able to control a corresponding result to return to the mobile terminal 100.

After completion of the command recognition and the search, the controller 180 is able to determine whether the recognized command is executable. For instance, the controller 180 is able to determine whether the source device retains the corresponding content or is able to determine whether the target device is able to play the corresponding content [S605].

As a result, if the controller 180 determines that the command is not executable, the controller 180 is able to perform a re-search by modifying a search word on a prescribed condition [S611].

Details of the re-searching step shall be described in detail later.

On the contrary, I the controller 180 determines that the user's speech command is executable, the controller 180 is able to control the recognized speech command and the search result to be displayed in a prescribed form on the display unit 151 [S606].

The displayed form of the recognized speech command and the search result shall be described in detail later.

If the recognized speech command and the search result are correct, the user enables a control to be performed according to the speech command by performing an execution manipulation [S608].

If the speech command is erroneously recognized as incorrect or is going to be changed, it is able to modify information displayed on the display unit by a speech re-recognition, a manipulation of the user input unit 130 or the like [S607]. If so, the controller 180 performs the re-search using the modified information [S612].

In the following description, the method of controlling the mobile terminal and the device connected to the mobile terminal using the speech recognition according to one embodiment of the present invention described with reference to FIG. 6 is explained in detail with reference to the accompanying drawings.

First of all, the step S606 of displaying the recognized speech command and search result is explained in detail with reference to FIG. 7 as follows.

Figure 7:
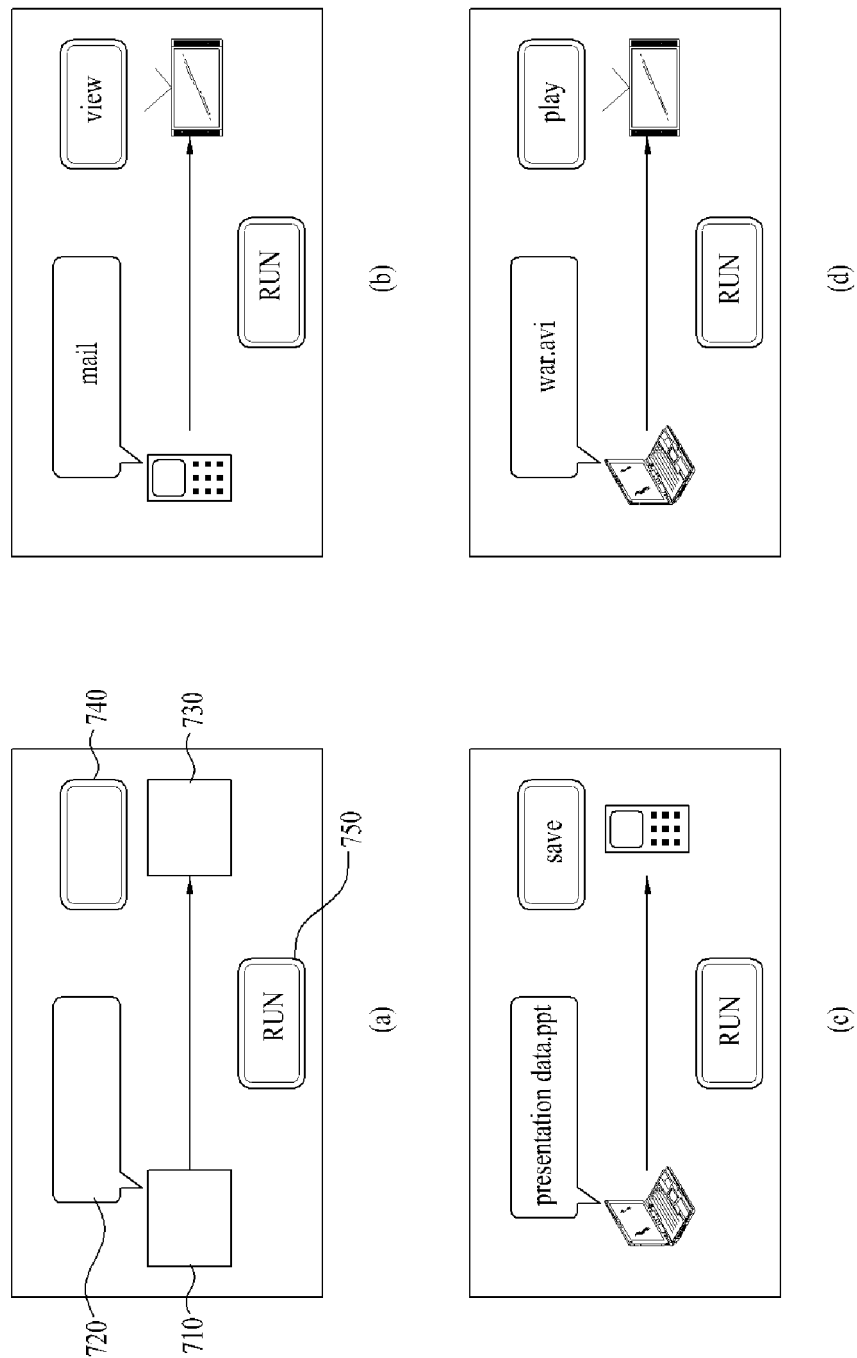
FIG. 7 is a diagram for one example of displaying a recognition result of a speech command inputted from a user and a search result on a display unit of a mobile terminal according to one embodiment of the present invention.

FIG. 7 is a diagram for one example of displaying a recognition result of a speech command inputted from a user and a search result on a display unit of a mobile terminal according to one embodiment of the present invention.

In the following description, a graphic user interface (GUI) for displaying a recognition result of a speech command and a corresponding search result according to the present invention shall be named 'recognition result window' for clarity.

Referring to FIG. 7 (a), a recognition result window displayable at least one region of the display unit 151 of the mobile terminal 100 according to the present invention can include a region 710 for displaying a source device, a region 720 for displaying a target content, a region 730 for displaying a target device, a region 740 for displaying an operation to execute, and a menu region 750 for determining whether a control will be performed according to a recognized command.

In particular, for example, if a speech command inputted by a user is 'Display a mail of a mobile terminal on a TV.', the recognition result window can have the form shown in FIG. 7 (b).

For another example, if a speech command inputted by a user is 'Save a presentation data file stored in a computer in a mobile terminal.', the recognition result window can have the form shown in FIG. 7 (c).

For another example, if a speech command inputted by a user is 'Play a war movie stored in a computer on a TV.', the recognition result window can have the form shown in FIG. 7 (d).

The forms of the recognition result window described with reference to FIG. 7 are just exemplary, by which the present invention is non-limited. Alternatively, the recognition result window can have various forms of a region arrangement structure. For instance, a source device or a target device is replaced by a text or can be displayed together with the text. A target content is replaced by an icon or can be displayed together with the icon.

Meanwhile, the target content is an element of the speech command that can have one of most diverse names. And, an extension of the target content may differ even if a user's speech and a content name are identical to each other. Therefore, the controller 180 may have a plurality of results from searching for target contents of the speech command inputted by the user. In this case, a method of displaying a search result for a target content according to the present embodiment is explained with reference to FIG. 8 as follows.

Figure 8:
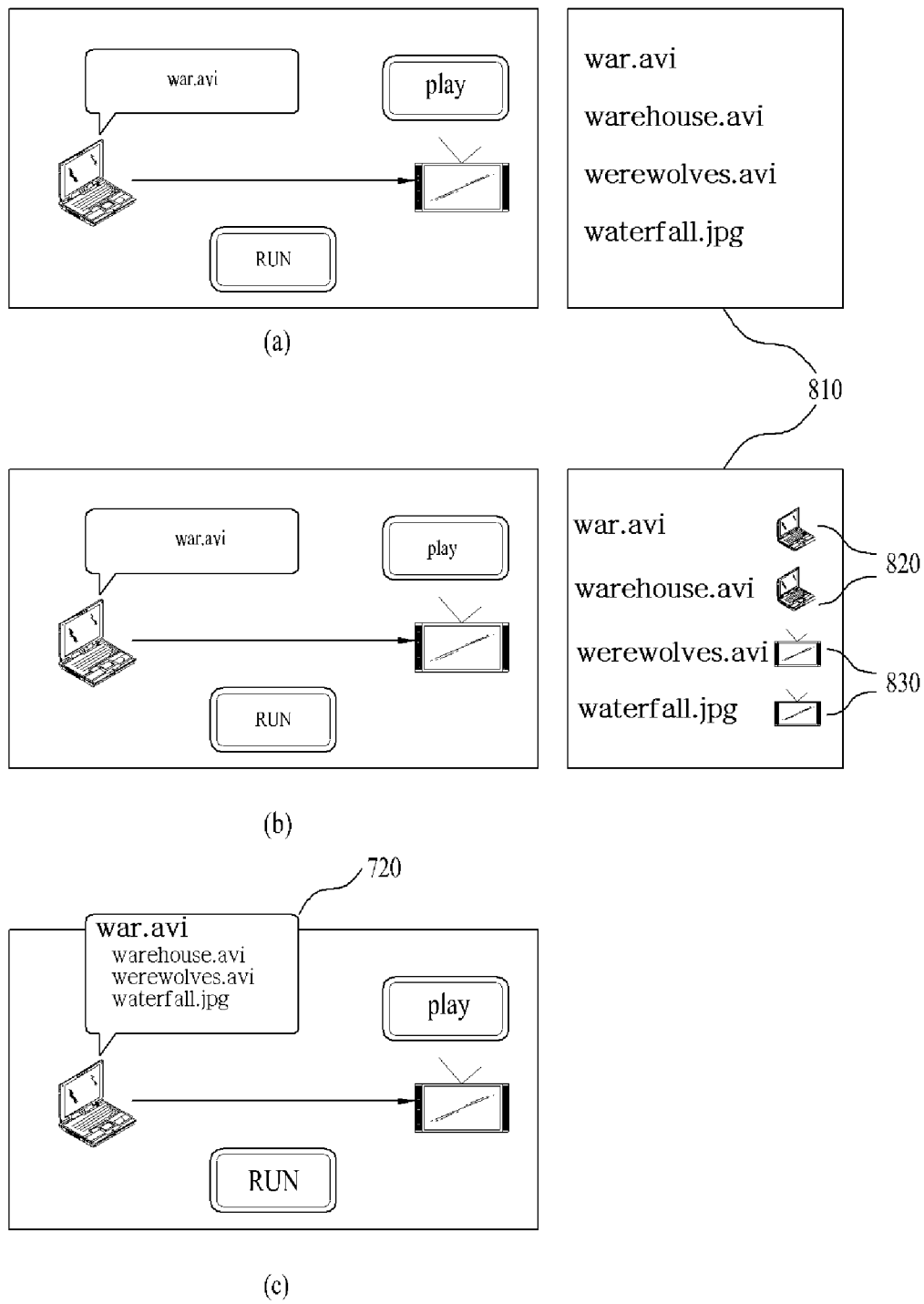
FIG. 8 is a diagram for one example of displaying a found target content on a recognition result window according to one embodiment of the present invention.

FIG. 8 is a diagram for one example of displaying a found target content on a recognition result window according to one embodiment of the present invention.

Referring to FIG. 8 (a), a content search result window 810 can be displayed in the vicinity of a recognition result window. In this case, a result from searching a source device for a target content in a user's speech command is displayed on the content search result window 810. In particular, a content closest to a name in the result of the search performed using a target content name recognized from the speech command can be displayed on the recognition result window and the rest of contents can be displayed on the content search result window. In doing so, the rest of the search result can be aligned/sorted according to a prescribed reference on the content search result window. For instance, if 'war movie' is included as a target content in a speech command inputted by a user, the controller 180 searches for 'war movie' or performs a search by recognizing 'movie' as an extension for a video format. As a result of the search, the controller 180 is able to control a file 'war.avi' to be displayed on the recognition result window shown in FIG. 8 (a). For another instance, a content, of which operation is not executable by a target device, can be excluded from a search result. And, a content tending to be more frequently selected to be played by a user can be displayed on an upper position.

If the controller 180 searches other connected devices as well as the source device in searching for a target content, referring to FIG. 8 (b), icons 820 and 830 indicating devices, at which the corresponding content is located, can be displayed in the vicinity of the content name in the content search result window 810.

For another form of displaying the content research result, referring to FIG. 8 (c), a most proximate content search result is first displayed by extending the content display region 720 in the recognition result window and the rest of search results can be displayed below the content search result in a manner that a different visual effect (e.g., a different font size, a different color, etc.) is given to the rest of the search results.

As a result from searching a source device for a target content included in a speech command inputted by a user, the corresponding content may not be found from the source device. In this case, a search for the corresponding content is performed on another connected device. This is explained with reference to FIG. 9 as follows.

Figure 9:
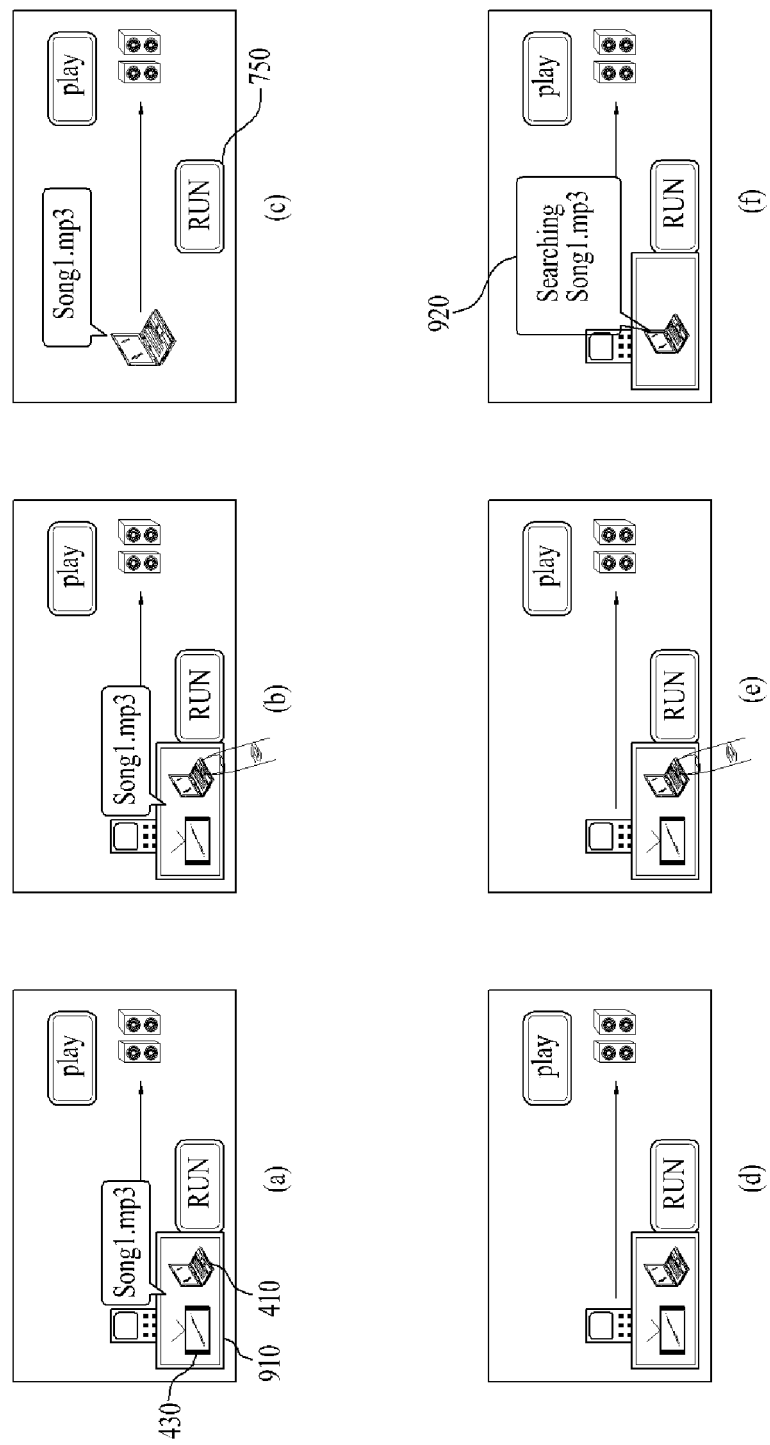
FIG. 9 is a diagram for one example of performing a search for a content in a different connected device if the corresponding content is not found in a source device of a mobile terminal according to one embodiment of the present invention.

FIG. 9 is a diagram for one example of performing a search for a content in a different connected device if the corresponding content is not found in a source device of a mobile terminal according to one embodiment of the present invention.

Referring to FIG. 9, in case that a user gives a speech command for playing a file 'song1.mp3' of the mobile terminal (i.e., a source device) in a speaker (i.e., external device connected to the mobile terminal), assume that the corresponding content is not found from the mobile terminal.

In this case, it is able to automatically search the rest of the connected devices except the source device for the corresponding content according to a setting or a prescribed command input (e.g., mobile terminal icon selection) of the user via the user input unit 130.

In case that the connected devices are automatically searched for the corresponding content, referring to FIG. 9 (a), a list 910 of the devices having the corresponding content exist therein can be displayed on one region of the recognition result window. In the list 910 of the devices, the devices having the corresponding content stored therein can be displayed as icons 410 and 430, respectively.

If the user selects a computer icon 410 from the device list 910 [FIG. 9 (b)], the computer icon can be displayed on a source device displayed region of the recognition result window instead of the mobile terminal icon. Subsequently, if the user selects a button 750 for the command execution, a music file stored in the computer can be played back via the connected external speaker.

On the contrary, if the connected devices except the source device are first displayed [FIG. 9 (d)], the user select an external device for performing the search for the corresponding content [FIG. 9 (e)], and then enables the search result performed on the selected device to be displayed as shown in FIG. 9 (f).

Meanwhile, the speech command may be recognized by the controller 180 unlike the user's intension. Moreover, even if the speech command is correctly recognized by the controller 180, the command may be changed prior to the command execution. For this, a convenient command changing method according to the present embodiment is explained as follows.

First of all, a method of changing a target content is explained with reference to FIG. 10 as follows.

Figure 10:
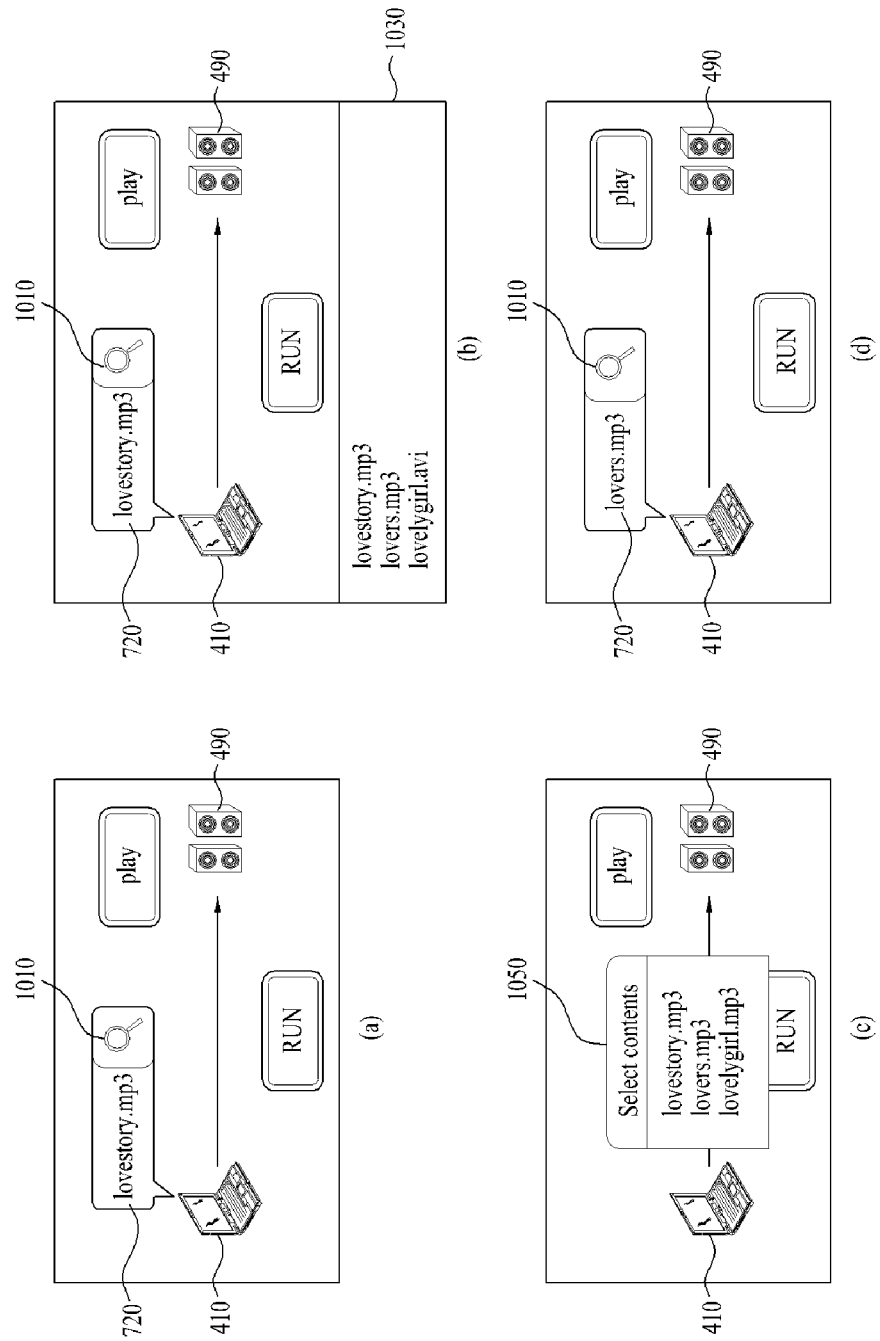
FIG. 10 is a diagram for one example of a method of changing a target content displayed on a recognition result window in a mobile terminal according to one embodiment of the present invention.

FIG. 10 is a diagram for one example of a method of changing a target content displayed on a recognition result window in a mobile terminal according to one embodiment of the present invention.

Referring to FIG. 10, although the controller 180 recognizes a user's speech command for playing a file 'lovestory.mp3' stored in a computer 410 via an external speaker 490, assume a case that a user intends to change a target content from the file 'lovestory.mp3' to 'lovers.mp3'.

Referring to FIG. 10 (a), a magnifying glass icon 101 is displayed on a region 720 on which a target content is displayed in a recognition result window.

In order to change a target content, a user selects the magnifying glass icon 101. If so, referring to FIG. 10 (b), a content list 1030 can be displayed in the vicinity of the recognition result window. In this case, contents included in the content list 1030 can include the contents included in a search result for a target content recognized from a speech command. Moreover, the contents included in the content list 1030 can be displayed in a manner of being sorted by the method described with reference to FIG. 8.

If the magnifying glass icon 101 is selected in FIG. 10 (a), a region 1050 for displaying the target content in the recognition result window is displayed in a manner of being extended. And, the found contents can be displayed on the extended region 1050 [FIG. 10 (c)].

In the situation shown in FIG. 10 (b) or FIG. 10 (c), it is able to change the target content, as shown in FIG. 10 (d), in a manner of selecting the user-specific content 'lovers.mp3'.

Moreover, in order to change a target content, the user is able to input a search word of the target content in various ways. This is explained with reference to FIG. 11 as follows.

Figure 11:
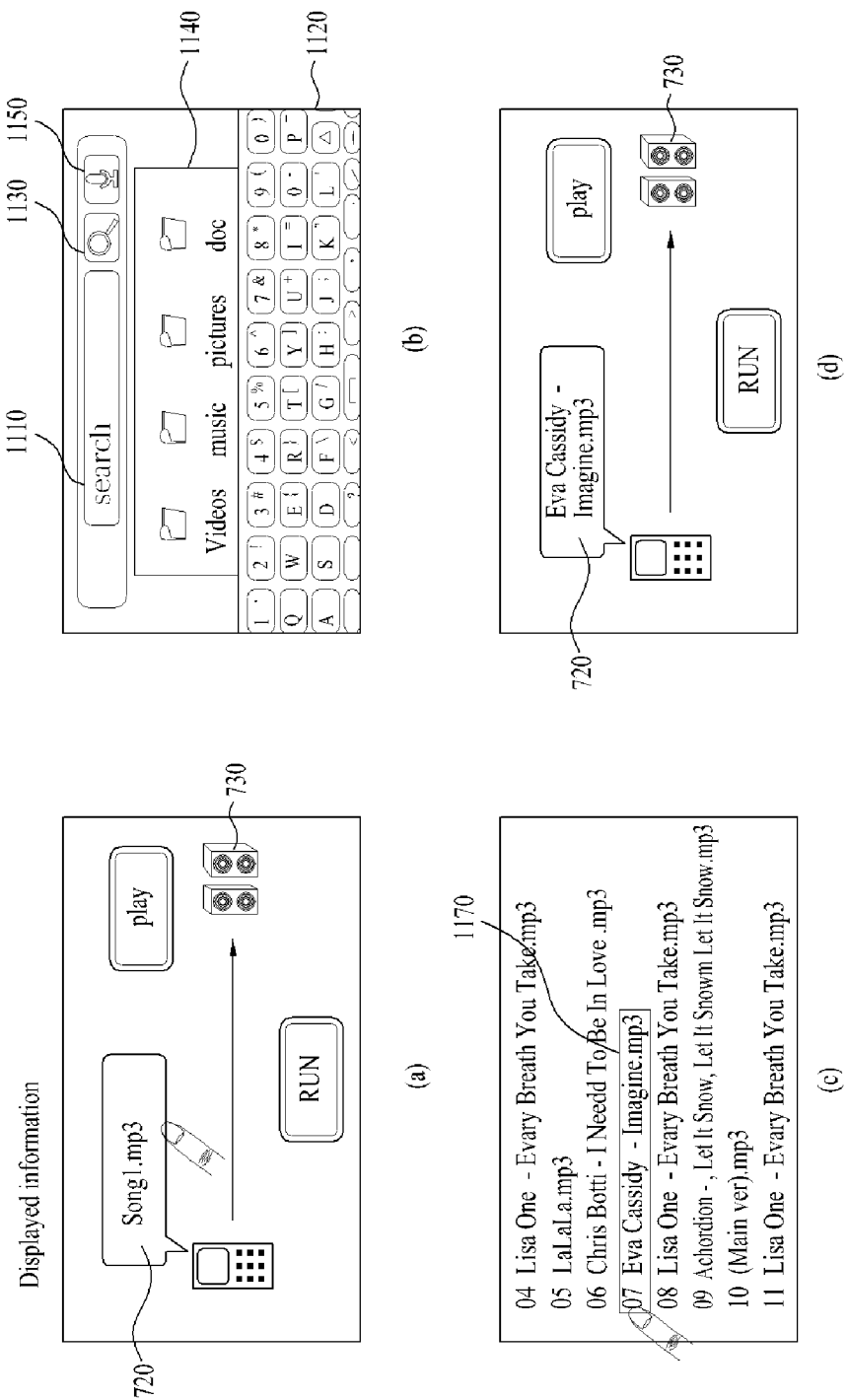
FIG. 11 is a diagram for another example of a method of changing a target content displayed on a recognition result window in a mobile terminal according to one embodiment of the present invention.

FIG. 11 is a diagram for another example of a method of changing a target content displayed on a recognition result window in a mobile terminal according to one embodiment of the present invention.

Referring to FIG. 11 (a), when a recognition result window for an inputted speech command is displayed, it is able to select a region 720 for displaying a target content from a recognition result window to change the target content.

If so, referring to 11 (b), a content search mode including various functions can be executed. In particular, a search word input window 1110 for enabling a user to directly input a search word, a virtual keypad 1120 provided as one means for inputting a search word to the search word input window 1110, a magnifying glass icon 1130 for determining whether to execute a search according to the search word inputted to the search word input window 110 and the like can included in the content search mode. Moreover, the content search mode can further include a category folder region 1140 for sorting contents of a source device or all connected devices per category and a microphone icon 115 for re-inputting the speech command.

If a user selects 'music' from the category folder region 1140, referring to FIG. 11 (c), a list of contents belonging to the music category can be displayed. If the user selects a music file #07 from the list, a target content is changed to display such a recognition result window as shown in FIG. 11 (d).

Meanwhile, as a content is changed by one of the above-described methods, a target device may not be able to perform an operation command for a target content. For instance, if a target device is an external speaker, it is unable to display an image of a video content. For this, a method of changing a target device according to the present embodiment is explained with reference to FIG. 12 as follows.

Figure 12:
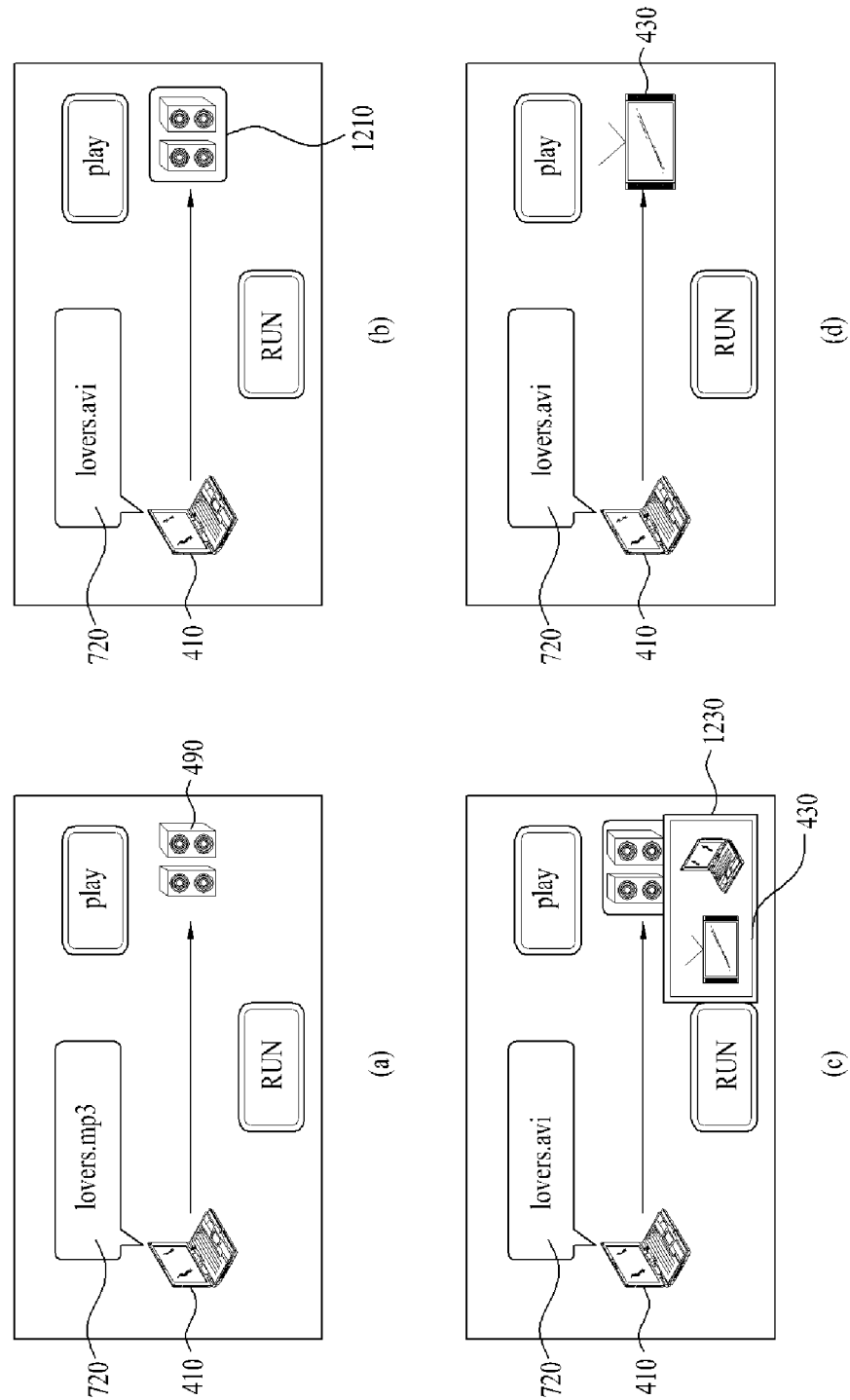
FIG. 12 is a diagram for one example of a method of switching a target device of a mobile terminal according to one embodiment of the present invention to another target device capable of performing an operation for a target content if the former target device is unable to perform the corresponding operation.

FIG. 12 is a diagram for one example of a method of switching a target device of a mobile terminal according to one embodiment of the present invention to another target device capable of performing an operation for a target content if the former target device is unable to perform the corresponding operation.

Referring to FIG. 12 (a), if a user's speech command is 'Play lovers music in a computer via a speaker.', a computer icon 410 is displayed as a source device on a recognition result window. A speaker icon 490 is displayed as a target device on the recognition result window. And, 'lovers.mp3' is displayed as a content name on a target content region 720.

Afterwards, the user changes a target content into a video content 'lovers.avi', as shown in FIG. 12 (b), by one of the methods described with reference to FIG. 11. In this case, since the speaker is unable to output a video, a prescribed visual effect 1210 is given in the vicinity of the speaker icon to indicate that an operation command for the corresponding content is inexecutable.

If the user selects the region for displaying the visual effect 1210 or as soon as the visual effect 1210 is displayed, referring to FIG. 12 (c), the devices capable of performing the command for the corresponding content among the external devices connected to the mobile terminal can be displayed on a prescribed region 1230.

If the user selects a TV icon 430 from the prescribed region 1230, referring to FIG. 12 (d), the TV icon 430 is displayed on the target device region and the visual effect 1210 given to the speaker disappears.

In the following description, a method of changing a source device is explained with reference to FIG. 13.

FIG. 13 is a diagram for one example of a source device switching method according to one embodiment of the present invention.

Referring to FIG. 13 (a), in order to change a source device, a user is able to select a mobile terminal icon displayed on a source device region of a recognition result window.

If so, referring to FIG. 13 (b), an icon list of the devices retaining the same content of 'song1.mp3' among the devices connected to the mobile terminal can be displayed on a prescribed region 1310.

If the user selects a computer icon 410, the source device is changed into a computer from a mobile terminal and a recognition result window can be displayed as a form shown in FIG. 12 (c). Subsequently, the user selects a command execute icon 750 to enable the content 'song1.mp3' stored in the computer to be outputted via an external speaker.

In the following description, a method of changing an operation command in a recognition result window is explained with reference to FIG. 14.

FIG. 14 is a diagram for one example of a method of changing an operation to execute in a speech command recognized by a mobile terminal according to one embodiment of the present invention.

Referring to FIG. 14 (a), a user is able to select an operation command region 740 of a recognition result window to change an operation for a target device to perform on a target content.

If so, referring to FIG. 14 (b), operations executable by the target device can be displayed. In this case, the displayed operations preferably include operations that can be performed on the corresponding content by the target device. For instance, if the target device is able to output audio except video and the target content is a video, a command 'play' is not displayed.

In this case, if the user selects a save operation, referring to FIG. 14 (c), 'save' can be displayed on the operation command region 740. Subsequently, the user selects a command execute icon 750 to enable the content 'song1.mp3' of the mobile terminal to be stored in the computer.

Meanwhile, in the above described embodiments, it is assumed that the icon 750 for executing the recognized command is provided to the recognition result window. Instead of assuming the icon 750, the operation command region 740 can be configured to have a function of command execution as well. This is explained with reference to FIG. 15 as follows.

FIG. 15 is a diagram for one example of a method of changing an operation to execute in a speech command recognized by a mobile terminal according to one embodiment of the present invention and then executing the changed operation.

Referring to FIG. 15, if a user performs a short touch on an operation command region 740 [FIG. 15 (a)], a list of operations executable on a corresponding content by a target device is displayed [FIG. 15 (b)]. If a long touch input is applied to the operation command region, the corresponding operation can be executed. Of course, a function assigned to the short touch and a function assigned to the long touch can be substituted from each other.

Moreover, an operation command region of a slide bar type 745 can be provided as shown in FIG. 15 (c). In this case, if a user selects the slide bar 745, referring to FIG. 15 (d), a list of operations executable on the corresponding content by a target device can be displayed. And, it is able to switch an operation to perform from 'play' to 'save'.

If the operation to perform is changed, the user applies a touch input to the slide bar 745 [FIG. 15 (e)]. If the slide bar 745 is dragged into an opposing region by maintaining the touched state [FIG. 15 (f)], the corresponding operation can be performed.

According to the embodiments mentioned in the above description, for example, a user inputs a speech command via the microphone 122 provided to the mobile terminal 100, by which the present invention is non-limited. And, the present invention is applicable to command inputs via various devices. For instance, embodiments of the present invention are applicable to a device having a microphone capable of converting a user's speech signal to a prescribed electric signal among devices connected to a mobile terminal as well as the mobile terminal.

Moreover, according to one embodiment of the present invention, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
a display unit;
a user input unit configured to receive an input of a command from a user;
a microphone configured to convert a speech signal to an electric signal;
a communication module configured to externally transceive a signal by wire/wireless; and
a controller, when connected to at least one external device via the communication module, and if the electric signal corresponding to a user's speech command is input via the microphone in a speech recognition mode, configured to recognize the speech command by analyzing the electric signal and display the recognized speech command as a prescribed graphic user interface (GUI) on the display unit,
wherein the speech command includes at least one selected from the group consisting of a target content, a source device having the target content, an operation to be performed on the target content and a target device to perform the operation,
wherein the GUI includes a visual information region indicating each of the target content, the source device and the target device, and
wherein if the target content is recognized from the speech command, the controller is further configured to perform a search for the target content on each of the mobile terminal and the connected at least one external device.

2. The mobile terminal of claim 1, wherein each of the source device and the target device is selected by the mobile terminal and the connected at least one external device.

3. The mobile terminal of claim 1, wherein the GUI further includes the operation.

4. The mobile terminal of claim 1, wherein the visual information region includes at least one selected from the group consisting of an icon, a text and an image.

5. The mobile terminal of claim 1, wherein if the search for the target content on each of the mobile terminal and the connected at least one external device is performed, the controller is further configured to sort a result of the search according to a prescribed reference.

6. The mobile terminal of claim 5, wherein the controller is further configured to display information on a content most proximate to the speech command in the sorted result of the search on the visual information region corresponding to the target content.

7. The mobile terminal of claim 6, wherein the controller is further configured to display the rest of content information except the information on the most proximate content in the sorted search result within or in the vicinity of the visual information region corresponding to the target content.

8. The mobile terminal of claim 7, wherein if detecting an input for selecting the region for displaying the information on the most proximate content via the user input unit, the controller is further configured to display the rest of the content information.

9. The mobile terminal of claim 7, wherein if one of the rest of the content information is selected, the controller is further configured to recognize a content corresponding to the selected content information as a new target content.

10. The mobile terminal of claim 9, wherein if the new target content is recognized, the controller is further configured to determine whether the operation is executable by the target device, and
wherein if the operation is not executable as a result of the determination, the controller is further configured to display information on the operation executable external device among the connected at least one external device via a prescribed region of the GUI.

11. The mobile terminal of claim 6, wherein if the visual information region corresponding to the operation is selected from the GUI, the controller is further configured to display an operation list including all operations executable on the target content by the target device.

12. The mobile terminal of claim 11, wherein the display unit comprises a touchscreen configured to recognize a touch input,
wherein if the touch input of a first pattern is detected from the visual information region corresponding to the operation on the touchscreen, the controller is further configured to display the operation list, and
wherein if the touch input of a second pattern different from the first pattern is detected from the visual information region corresponding to the operation, the controller is further configured to execute the speech command displayed on the GUI.

13. The mobile terminal of claim 11, wherein the display unit comprises a touchscreen configured to recognize a touch input,
wherein the visual information region corresponding to the operation is represented as a slide bar, and
wherein if detecting an input of dragging the slide bar on the touchscreen in one direction over a prescribed distance, the controller is further configured to execute the speech command displayed on the GUI.

14. The mobile terminal of claim 6, wherein the GUI further includes an icon for enabling a user to select whether to execute the recognized speech command, and
wherein if the icon is selected by an input via the user input unit, the controller is further configured to execute the recognized speech command.

15. The mobile terminal of claim 6, wherein if the visual information region corresponding to the source device is selected from the GUI, the controller is further configured to display at least one of the at least one external device including the same as the most proximate target content as a prescribed list.

16. The mobile terminal of claim 1, wherein the controller is further configured to use STT (speech to text) scheme to recognize the speech command by analyzing the electric signal.

17. A method of controlling a mobile terminal, the method comprising:
performing a connection to at least one external device via a communication module configured to externally transceive a signal by wire/wireless;
if an electric signal corresponding to a user's speech command is input via a microphone in a speech recognition mode, recognizing the speech command by analyzing the electric signal, the speech command including at least one selected from the group consisting of a target content, a source device having the target content, an operation to be performed on the target content and a target device to perform the operation;
displaying the recognized speech command as a prescribed graphic user interface (GUI) on a display unit; and
if the target content is recognized from the speech command, performing a search for the target content on each of the mobile terminal and the connected at least one external device,
wherein the GUI includes a visual information region indicating each of the target content, the source device and the target device.

* * * * *